Jan. 22, 1963 C. L. RAVER 3,074,591
PRESSURE CLOSURE
Filed Dec. 9, 1960 4 Sheets-Sheet 1

INVENTOR
C. LEO RAVER,
BY
ATTORNEYS

Jan. 22, 1963  C. L. RAVER  3,074,591
PRESSURE CLOSURE
Filed Dec. 9, 1960  4 Sheets-Sheet 2
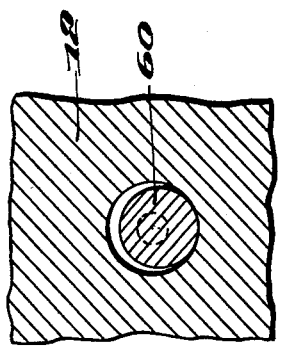
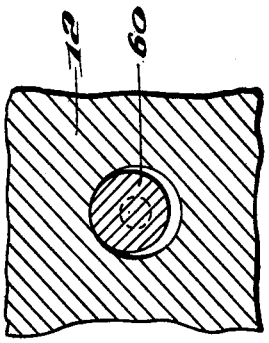
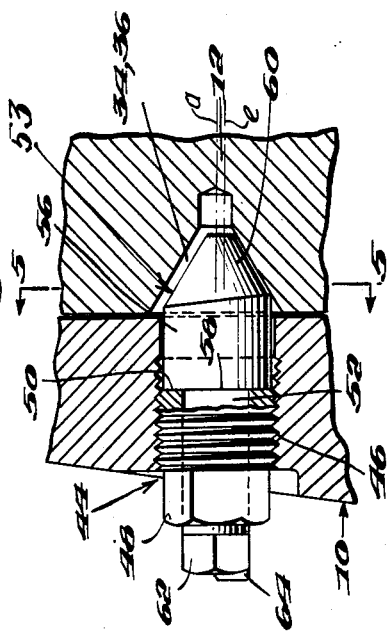
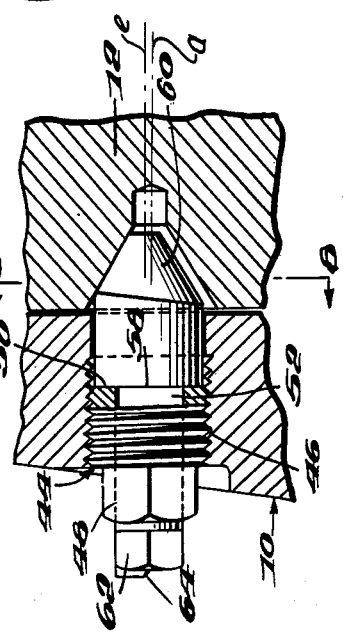
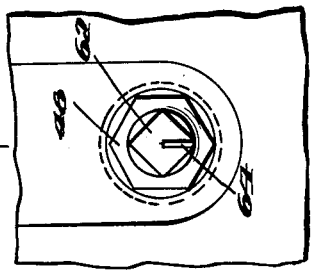
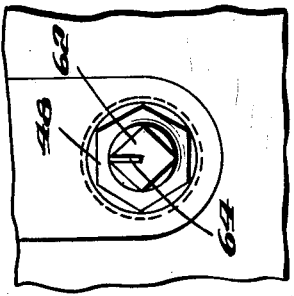
INVENTOR
C. LEO RAVER,
BY *Kenson, Palmer & Stewart*
ATTORNEY

INVENTOR
C. LEO RAVER,

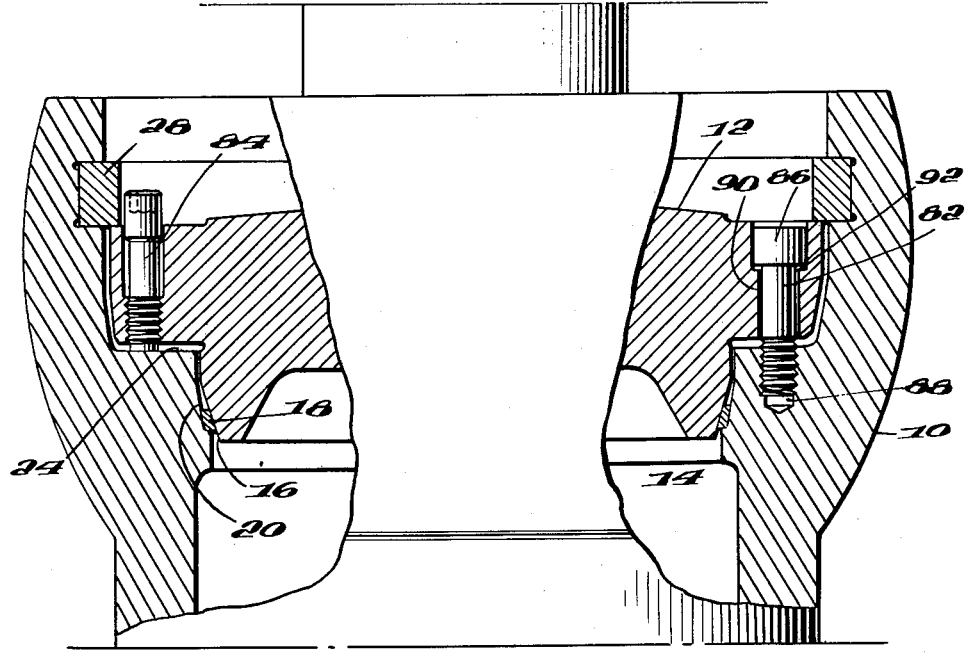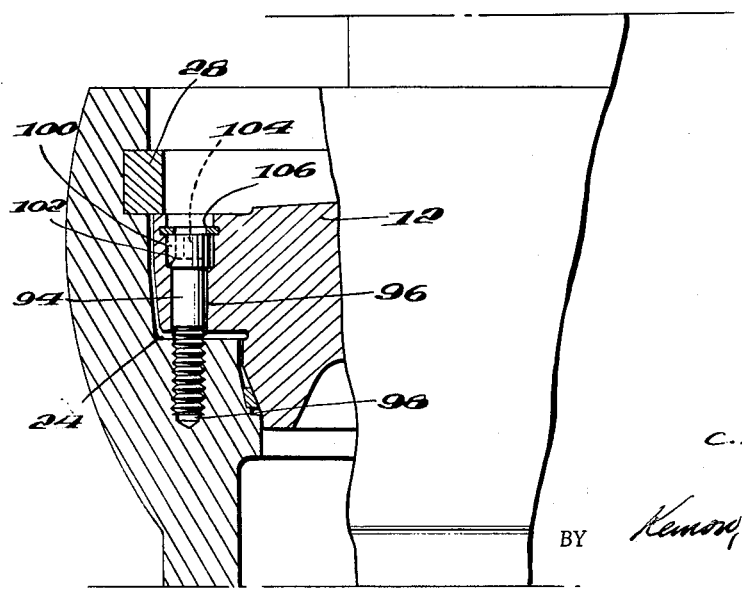

United States Patent Office 3,074,591
Patented Jan. 22, 1963

3,074,591
PRESSURE CLOSURE
Clarence Leo Raver, 3001 Engelke St., Houston 3, Tex.
Filed Dec. 9, 1960, Ser. No. 74,933
9 Claims. (Cl. 220—46)

This invention relates to pressure closures and more particularly, it concerns a pressure closure assembly of the type including a seal and a cover member retained against vessel pressures by a shear ring or the like.

In the design of pressure closures adapted to be used on vessels containing fluid pressures on the order of several thousand pounds per square inch at high temperatures, many problems arise. For example, a seal must be provided between the closure member and the vessel to assure against leakage, and at these high temperatures and pressures, the stresses imposed on the seal are of such a magnitude that it may deform or rupture, resulting in unwanted leakage. In many respects, the problems of effecting a good seal between a closure member and the vessel at high pressures and temperatures have been overcome by the use of a sealing ring, the radial cross-section of which is tapered in the direction of internal vessel pressure forces so that any stresses thereon due to vessel pressures increase the seal seating pressures. Seals of this type are disclosed in U.S. Patent No. 2,687,229, issued on August 24, 1954, to Milton P. Laurent.

In addition ot the establishment of a good seal between the closure member and the vessel, however, care must be taken that adequate means is provided to retain the closure member against the high internal vessel pressures. Perhaps the most satisfactory arrangement for retaining a closure of this type is one which incorporates shear rings or shear ring segments by which optimum use of material strength is realized, thereby keeping the size and mass of the structure necessary to retain the pressures at a minimum. While such shear members provide the necessary strength, their use makes it difficult to adjust the closure member with respect to the seal and the vessel, and further, when shear rings are used, a problem is presented by the lack of any positive and rigid interconnection of the vessel and closure structure except, of course, that which is created by the closure member being urged outwardly against the shear ring under the influence of vessel pressures. Structural rigidity of this nature is essential to assure effective sealing if the vessel to which the closure is applied is subject to any outside forces such as those incurred during transport, accidental jarring and impacts, forces developed by adjustment of ancillary components such as a valve and the diverse stresses which may result from variations in vessel pressures. In pressure closures heretofore available, structural rigidity was achieved, in most instances, merely by a plurality of tension bolts drawn tight across the closure member, seal and shear ring. Or, compression bolts or studs have been used to apply a separating force, thereby rigidifying the assembly. In all of these prior art devices, however, the stresses used to make the assembly rigid were transmitted through the seal, thus adding to the load already imposed thereon, or the devices for making the assembly rigid carried a substantial portion of the pressure load. As a result, either some of the effectiveness of the seal was sacrificed by the transmission of rigidifying stresses therethrough or the rigidifying means was subject to failure since the entire vessel pressure was imposed thereon.

Accordingly, an object of this invention is to provide a new and unique pressure closure by which the problems aforementioned are effectively and substantially overcome.

Another object of this invention is to provide a closure by which the cover member may be made rigid with the vessel without the transmission of rigidifying stresses through the seal between the closure member and the vessel.

A further object of this invention is the provision of a pressure closure of the type referred to provided with means for rendering rigid the closure member with the vessel which means for attaining rigidity is not loaded by the transmission of forces resulting from operating pressures within the vessel.

Another object of this invention is the provision of a pressure closure assembly of the type referred to which may be easily and quickly assembled without requiring special tools or mechanical ability.

A further object of this invention is the provision of a pressure closure particularly suitable for use with annular seals of the type tapered in the same direction as pressure forces so as to become more firmly seated under the effect of pressure.

Still another object of this invention is to provide a closure of the type aforementioned which permits optimum development of material strength and which is extremely compact.

Other objects and further scope of applicability of the present invention will become apparent from the detailed description given hereinafter. It should be understood, however, that the detailed description, while indicating preferred embodiments of the invention, is given by way of illustration only, since it will become apparent to those skilled in the art from this description, that various changes and modifications can be made without departing from the spirit and scope of this invention.

In general, the aforementioned objects are accomplished by a pressure closure assembly including a closure member receivable in the opening of a pressure vessel and suitable shear resistant means such as a shear ring or shear ring segments adapted to be placed in an annular groove to overly the closure member after it is in place in the vessel opening. An annular seal is disposed between the cover member and the vessel opening and means is provided for drawing the closure member inwardly against the seal to permit insertion of the shear ring segments. Separate means are provided for moving the cover member outwardly against the shear ring to render the assembly rigid, this means being in the form of studs or compression bolts. Although several embodiments are contemplated in each instance, these studs or compression bolts are placed in either shear or compression rather than tension and act in such a manner that transmission of rigidifying stresses do not affect stresses in the closure seal.

A more complete understanding of the new and improved pressure closure of this invention and its method of use may be had by reference to the accompanying drawings in which:

FIG. 3 is an end elevation showing a modified form of the invention;

FIG. 4 is a cross-sectional view taken along line 4—4 of FIG. 3;

FIG. 5 is a cross-sectional view taken along line 5—5 of FIG. 4;

FIGS. 6 through 8 are views corresponding to FIGS. 3 through 5 showing the device thereof in a different position;

FIG. 12 is a partial cross-sectional view illustrating another form of this invention;

FIG. 13 is a fragmentary cross-sectional view illustrating still a further embodiment of this invention.

Figure 1:
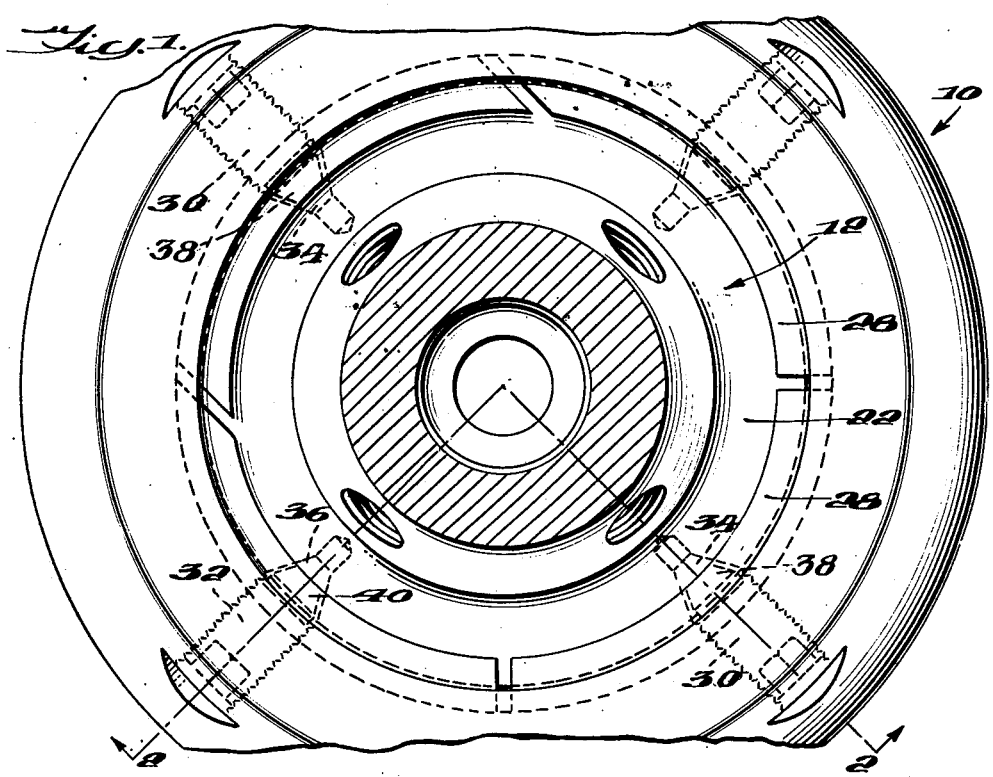
FIG. 1 is a fragmentary plan view illustrating the pressure closure of this invention as applied to a valve.
Figure 2:
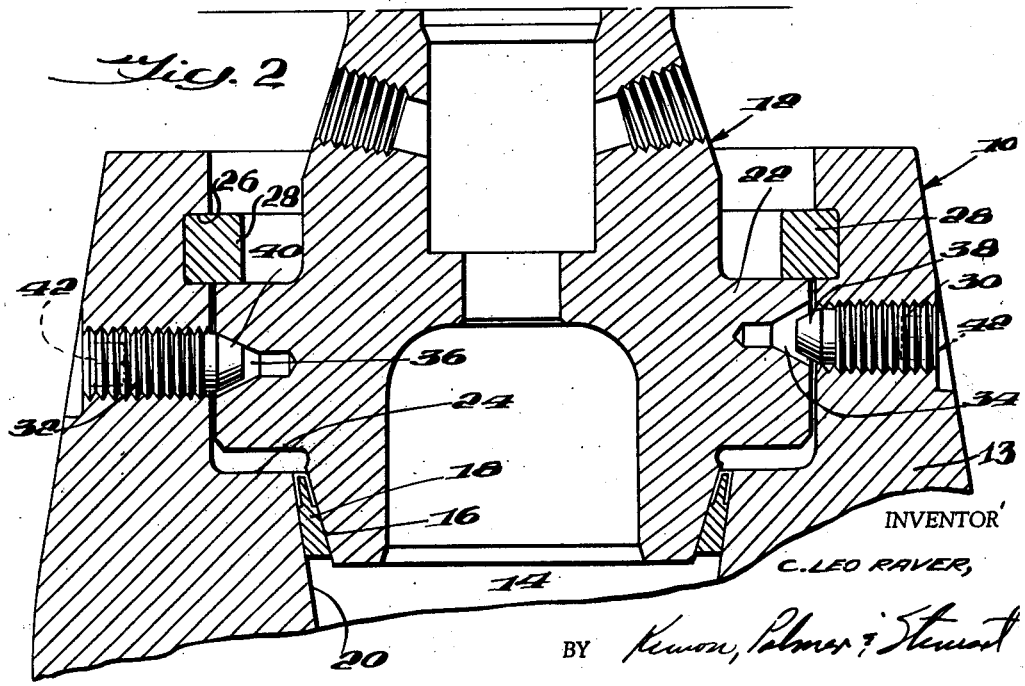
FIG. 2 is a cross-sectional view of a right angle segment cut out along lines 2—2 of FIG. 1.

Referring now to the drawings wherein like reference numerals indicate like parts and particularly to FIGS. 1 and 2 in which one form of the invention is shown, a pressure vessel is designated generally by the numeral 10 and a cover member by the numeral 12. In the particular application shown, the closure member is in the form of a valve bonnet while the vessel is a valve body. It is contemplated, however, that the pressure closure of this invention may be used in many diverse applications wherein high pressure, high temperature fluids are to be contained, and accordingly it is to be understood that the invention is sufficiently broad to include in its scope pressure closures for angle valves, gate valves, gas storage vessels, or the like and is applicable to all sizes of these devices.

The pressure vessel 10 in this instance is formed having an annular wall 13 to define opening 14 within which the closure member is received. Preferably, the lower portion of the closure member is provided with a frustoconical seating surface 16 for engagement with a seal 18 which in turn seats within conical wall surface 20 of the opening 14. As described in the aforementioned Laurent patent, the angles which the surfaces 16 and 20 make with the vertical differ in a manner such that relative to themselves they taper or converge outwardly of the vessel. Thus, pressures within the vessel 10 tend to urge the seal more tightly into engagement with the surfaces 16 and 20 in the closure member and vessel respectively.

The closure member 12 is provided at its mid-portion with an annular flange 22 and also, the opening in the vessel 10 is increased in diameter to accommodate the flange, thereby defining an annular shoulder 24. In the upper portion of the opening 14 is formed a groove 26 within which is received a shear-resistant means such as a plurality of shear ring segments 28 which have a radial dimension exceeding the depth of the groove 26 and therefore project radially into the upper portion of the opening 14 when in place.

For the purpose of drawing the closure member 12 into the opening 14 against the seal 16 and as well, to render the assembly rigid, a plurality of radial cam studs 30 and 32 respectively are provided in the wall 13. In the embodiment shown, these studs are arranged in diametric pairs, there being one pair of cam studs 30 and one pair of cam studs 32. As shown in FIG. 2, it will be noted that the studs 30 and 32 are situated at different elevations and further, that the flange portion 22 of the cover member 12 is provided with frusto-conical shaped or tapered recesses 34 and 36 which complement frusto-conical shaped or tapered noses 38 and 40 on the studs 30 and 32 respectively. It will be noted that the studs are threadedly received within correspondingly threaded bores in the walls surrounding the vessel opening 14 and are provided with hexagonally shaped recesses 42 for receiving an Allen wrench or the like by which they may be rotated and thereby threaded radially inwardly or outwardly as desired. Also, while the individual recesses 34 and 36 are preferred, it is contemplated that a continuous groove might be formed about the periphery of the flange 22 and having tapered lower and upper edges to co-act with the studs 30 and 32 as described below.

In use, the pressure closure illustrated in FIGS. 1 and 2 is assembled by first placing the seal ring 18 against the surface 20 of the vessel aperture 14 and then placing the closure member 12 in position such that the surface 16 thereof contacts the ring 18. At this point, the two cam studs 30 are moved inwardly so as to engage the lower or outwardly and downwardly sloped surface of the recess 34 thereby camming the closure member 12 inwardly against the seal 18. When the closure member has moved sufficiently into the opening 14 so that the flange 22 thereof is even with or below the groove 26 in the vessel opening, the shear ring segments 28 are inserted in the groove and the cam studs 30 backed off by reversely threading them substantially to the position shown in FIG. 2. At this point, the assembly preferably is subjected to a test pressure to assure proper seating of the seal 18 and while this pressure is applied, the cam studs 32 are moved inwardly so that the conical nose thereof engages the uppermost or upwardly and outwardly facing slope of the recesses 36 to cam the closure member 12 upwardly against the shear segments 28, thus rendering rigid the closure member 12, the shear segments 28 and the vessel 10.

In the embodiment of FIGS. 3 through 8, the combined effect of the cam studs 30 and 32 of the embodiment of FIGS. 1 and 2 is realized by a cam assembly designated generally by the reference numeral 44. The assembly includes an annular screw member 46 having a hex-nut 48 at its outer end and a radial face 50 at its inner end. Receivable within the annular screw 46 is the shank 52 of a rotatable cam member 53 having a cylindrical head portion 56 defined at its outermost end by an annular shoulder 58 rotatably abutting the radial face 50 on the screw 46. The inner end of the head portion 56 is provided with a conical camming surface 60, the axis e of the camming surface being eccentric with the axis a of the assembly 44. The shank 52 is provided with a square nut 62 at its outer end as well as with a marker 64 positioned to provide an indication of the positioning of the axis e with respect to the axis a of the assembly 44.

The embodiment of FIGURES 3 to 8 is used to carry out the same operation as that of FIGS. 1 and 2. In this instance, however, the rotatable member of the assembly is adjusted by turning on the nut 62 until the indicator 64 is positioned downwardly as shown in FIGS. 3 and 4. Thus, the eccentric axis e of the camming surface 60 is below the axis a of the assembly. With the axis of the camming surface so positioned, the hex-nut 48 is turned to thread the annular screw inwardly and carrying with it the camming surface 60 into engagement with the downwardly and outwardly sloping surface of the recess 34, 36, thereby drawing the closure member 12 downwardly against the seal in the manner described with reference to the embodiment of FIGS. 1 and 2. When the position of the closure member is such that the flange 22 thereon becomes even with or lower than the groove 26, the shear ring segments are then inserted. If the seal is to be seated by internal test pressure, then the assembly 44 should be withdrawn by reverse rotation of the hex-nut 48. Thereafter, the cam surface 60 is rotated until the axis e is above the axis a of the assembly as indicated by the marker 64 and the assembly moved inwardly by rotation of the hex-nut 48. In this instance the camming surface will engage the upwardly and outwardly facing surface of the apertures or recesses 34, 36 to move the closure member 12 upwardly against the shear ring segments, thereby rigidifying the closure assembly.

Alternatively, in the mebodiment of FIGS. 3 to 8 the rigidifying force may be developed in some situations merely by rotating the nut 62 so that the cam axis e moves from its lower position to its upward position without withdrawing the screw 48. The ultimate position of the assembly 44 is shown in FIGS. 6 through 8 wherein the camming surface 60 is in engagement with the recess 34, 36 urging the closure member 12 upwardly.

Figure 9:
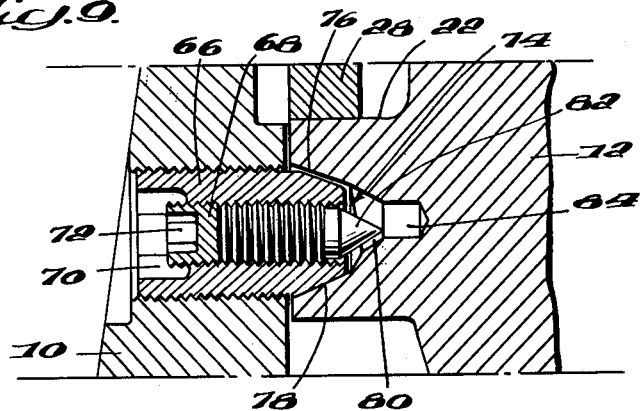
FIG. 9 is a fragmentary cross-sectional view illustrating another embodiment of this invention.
Figure 10:
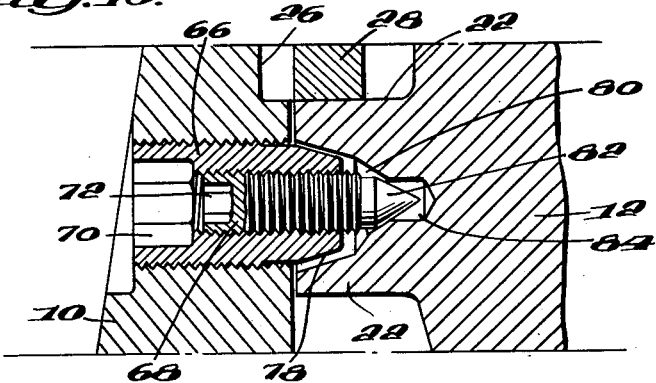
FIG. 10 is a cross-sectional view illustrating the embodiment of FIG. 9 in a different position.
Figure 11:
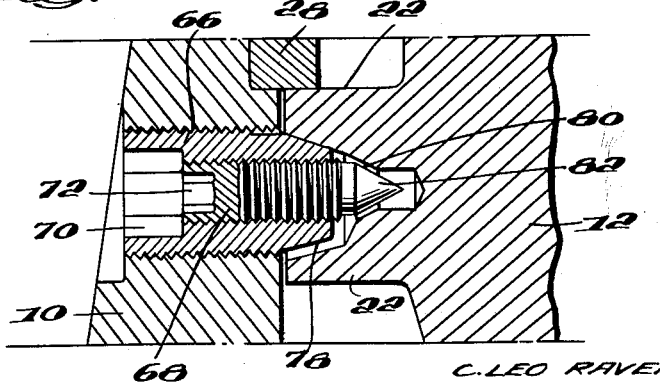
FIG. 11 is a cross-sectional view illustrating the embodiment of FIGS. 9 and 10 in still another position.

In the embodiment of FIGS. 9 through 11, the setting of the closure member 12 is accomplished by the concentric screws 66 and 68 respectively. Both screws preferably are provided at their outer ends with hexagonally or otherwise shaped recesses for receiving an Allen wrench or the like, the recesses being designated by the numerals 70 and 72 respectively, though other means, such as nut-shaped heads may be used. In this instance, recesses 74 are provided in the flange 22 of the closure member 12 which recess is formed having an enlarged conical shaped outer portion 76 for receiving and co-acting with a conical camming surface 78 on the outer screw 66 and an eccentric, generally conical, portion 80 for co-acting with a conical nose 82 on the inner screw 68, a cylindrical extension 84 being provided for accommodating inward movement of the screw 68.

Operation of the device shown in FIGS. 9 and 10 begins with turning the outer screw 66, moving it inwardly with the conical surface 78 thereof in engagement with the lower or downwardly and outwardly sloped surface of the large portion 76 of the recess 74 until the limits of inward movement are reached. Thereafter, the central screw 68 is rotated and moved inwardly with the conical nose 82 thereof in engagement with the lower surface of the eccentric portion 80 of the bore 74 as shown in FIG. 10 until the shoulder 22 becomes even with or lower than the groove 26 thereby permitting insertion of the shear ring segments 28. With the shear ring segments in place the central screw 68 is retracted and the outer screw 66 again moved inwardly, this time with the camming surface 78 thereof in engagement with the upper or outwardly and upwardly sloping surface of the recess 74 urging the closure member upwardly to make it rigid with the shear ring and vessel 10.

In each of the preceding embodiments it will be noted that the means by which the closure member 12 is drawn inwardly against the seal and then urged outwardly against the shear ring to render the assembly rigid was disposed radially about the vessel opening 14. In the embodiment of FIG. 12, similar results are achieved by axially disposed bolts 82 and cap screws 84. In this instance, the bolts 82 having heads 86 formed thereon are threadedly received in apertures 88 in the shoulder 24 of the vessel 10. The bolt shanks pass through apertures 90 in the closure member 12 which apertures are provided with an upwardly facing shoulder 92 for engagement by the bolt heads 86. The cap screws 84, on the other hand, are threadedly received in the closure member 12 in a manner such that the ends thereof abut the shoulder 24 of the vessel.

Thus, it will be seen that the setting of the closure member 12 may be effected first by drawing it inwardly against the seal 18 by tightening the bolts 82 and after the seal has been set in the aforementioned manner the bolts 86 are released or withdrawn to the position illustrated in FIG. 12 and the cap screws 84 are drawn downwardly into compressive engagement with the shoulder 24 to lift the closure member upwardly against the shear ring 28 thereby rendering the closure assembly rigid.

The embodiment of FIG. 13 differs from that of FIG. 12 in that a plurality of bolts 94 (only one being shown) pass through apertures 96 in the cover member 12 and are threadedly received in apertures 98 in the shoulder 24 of the vessel. The bolts 94 are formed having heads 100 engaging an upwardly facing shoulder 102 in the aperture 96 which heads are formed having hexagonal recesses 104 to facilitate turning by an Allen wrench or the like. A shear ring 106 is inserted over the bolt 94 so that upward movement of the bolt carries with it the closure member 12. Thus, in use, the downward or inward movement of the closure member 12 is effected by tightening the bolts 94 while outward or upward movement of the closure member to effect the rigid assembly is by unthreading the bolts 94, the shear rings 106 operating to carry the closure member 12 upwardly against the shear ring 28.

Thus, it will be seen that by this invention the above mentioned objectives are completely fulfilled. Although the advantages thereof may be realized in a number of different forms as described, it will be noted that the stresses required to urge the closure member 12 against the shear ring segments 28 for rendering the assembly rigid is directly from the vessel to the closure member and not through the seal ring 18. In this manner, the highly desirable rigidity is achieved without affecting the forces on the seal ring. Further, it will be noted that the studs or cap screws by which the closure member 12 is urged against the shear ring 28 act in either shear or compression rather than tension, and therefore it is not necessary that these members be large in size to develop the necessary strength required. Furthermore, since these members act between the vessel and the closure, the forces within the pressure vessel 10 in urging the cover member outwardly for rigidifying purposes tends to relieve the studs or cap screws of the rigidifying stress imposed thereon.

Since other forms of this invention will become apparent to those familiar in the art from the foregoing description, it is to be understood that the detailed description is illustrative only and not limiting, the ultimate determination of the true spirit and scope of the invention being taken from the appended claims.

I claim:

1. A pressure closure assembly comprising in combination: a vessel; an annular wall on said vessel having a radial groove formed in the inwardly facing surface thereof; shear resistant means receivable in said groove and projecting radially from the inwardly facing surface of said wall; a closure member receivable within said wall; seal means between said member and said vessel; means for drawing said member into said vessel against said seal means to permit insertion of said shear resistant means in said groove overlying said member; and means for drawing said member outwardly against said shear resistant means, whereby said vessel, said shear resistant means and said closure are rigidly interconnected without transmission of rigidifying stresses through said seal means.

2. A closure assembly for a pressure vessel having an opening and a radial groove formed in the wall of the opening comprising: a closure member receivable in the said opening; a seal between said closure member and the opening; means for drawing said closure member into the opening against said seal; shear resistant means receivable in the groove to retain said closure member against internal vessel pressure; and means for urging said closure member against said shear resistant means to rigidify the assembly without transmission of rigidifying stresses through said seal, said last mentioned means being relieved of stress by internal vessel pressures.

3. A closure assembly for a pressure vessel having an opening comprising: a removable shear resistant means in said opening; a closure member receivable in the opening; a pressure seal between said closure member and the opening; means for drawing said closure member into the opening against said seal to permit insertion of said shear resistant means; and means for urging said closure member against said shear resistant means to rigidify the assembly without transmission of rigidifying stresses through said seal, said last mentioned means being relieved of stress by internal vessel pressures.

4. The assembly recited in claim 3 in which said closure member is formed having recesses about the periphery thereof and said means for drawing said closure member into the opening against said seal and said last mentioned means respectively include a plurality of radial cam members about the vessel opening engageable upon inward movement with the lower surface of the recesses in said closure member and a plurality of radial cam members about the vessel opening engageable upon inward movement with the upper surface of the recesses in said closure members.

5. The assembly recited in claim 4 in which said radial cam members are concentric.

6. The assembly recited in claim 3 in which said closure member is formed having recesses in the periphery thereof and said means for drawing said closure member into the opening against said seal and said last mentioned means respectively include a plurality of radially positioned rotatable members in the vessel projecting into recesses in said closure member, said rotatable members having a camming surface thereon eccentric with the axis of rotation, and means for moving said members inwardly into engagement with the lower surface of said recesses in said closure member when camming surface is eccentric under the axis of rotation and into engagement with the upper surface of said recesses in said closure member when said camming surface is eccentric over the axis of rotation.

7. The assembly recited in claim 3 in which said means for drawing said closure member into the opening against said seal and said last mentioned means respectively include a plurality of tension bolts threadedly received in said vessel and a plurality of compression bolts threadedly received in said closure member.

8. The assembly recited in claim 3 in which said means for drawing said closure member into the opening against said seal and said last mentioned means respectively include a plurality of bolts threadedly received in said vessel, said bolts having heads disposed in bores in said closure member; means in the bores limiting axial movement of said bolt heads relative to said closure member.

9. In a pressure vessel formed having an opening, a radial groove in the opening and a shear ring receivable in the groove in a manner to project inwardly of the opening, a closure assembly comprising: a closure member receivable in the opening underlying the shear ring; seal means between said closure member and the vessel; and means for rendering said closure member rigid with the shear ring and vessel, said means being positioned to act directly between the vessel and said closure member without transmission of rigidifying stresses through said seal means to urge said closure member against said shear ring, whereby said means is relieved of stress by pressures within the vessel and said seal means is unaffected by the rigidifying stresses.

References Cited in the file of this patent

UNITED STATES PATENTS

| | | |
|---|---|---|
| 2,226,495 | Jacocks | Dec. 24, 1940 |
| 2,239,912 | Fischer | Apr. 29, 1941 |
| 2,760,673 | Laurent | Aug. 28, 1956 |
| 2,797,948 | Tangard | July 2, 1957 |
| 2,967,639 | Kuentzel | Jan. 10, 1961 |